United States Patent [19]
Hamasaki et al.

[11] 3,799,578
[45] Mar. 26, 1974

[54] VEHICLE SAFETY DEVICE

[75] Inventors: Masafumi Hamasaki, Nobeoka; Takashi Haruna, Yokosuka, both of Japan

[73] Assignee: Nissan Motor Company, Limited, Yokohama, Japan

[22] Filed: Sept. 23, 1971

[21] Appl. No.: 183,175

[30] Foreign Application Priority Data
Sept. 24, 1970 Japan.................... 45-82992

[52] U.S. Cl. .................................. 280/150 AB
[51] Int. Cl. .............................................. B60r /08
[58] Field of Search............................ 280/150 AB

[56] References Cited
UNITED STATES PATENTS

| | | | |
|---|---|---|---|
| 3,618,979 | 11/1971 | Gulette | 280/150 AB |
| 2,931,665 | 4/1960 | Sandor | 280/150 AB |
| 3,680,886 | 8/1972 | Mazelsky | 280/150 AB |
| 3,642,303 | 2/1972 | Irish | 280/150 AB |
| 3,441,290 | 4/1969 | Berryman et al. | 280/150 AB |
| 3,580,603 | 5/1971 | Chute | 280/150 AB |
| 3,506,281 | 4/1970 | Berryman | 280/150 AB |
| 3,675,942 | 6/1972 | Huber | 280/150 AB |
| 3,618,977 | 11/1971 | Klove, Jr. | 280/150 AB |

FOREIGN PATENTS OR APPLICATIONS

| | | | |
|---|---|---|---|
| 1,280,072 | 10/1968 | Germany | 280/150 AB |

*Primary Examiner*—Kenneth H. Betts

[57] ABSTRACT

A safety device for protecting an occupant of a vehicle during a collision comprises an inflatable confinement mounted in the vehicle. The confinement, when inflated, take the shape of a frustum of a cone having the base surface thereof being engageable with at least the upper portion of the occupant's body including his head. The fact that the confinement is formed frusto-conically rather than cylindrically enables the use of a fluid source having a relatively small capacity and also serves to minimize pressure buildup in the vehicle compartment resulting from the inflation of the confinement during the collision.

1 Claim, 4 Drawing Figures

PATENTED MAR 26 1974 3,799,578
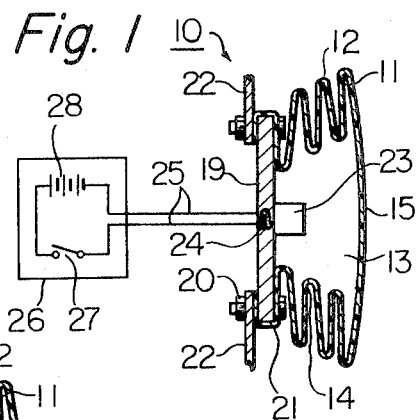
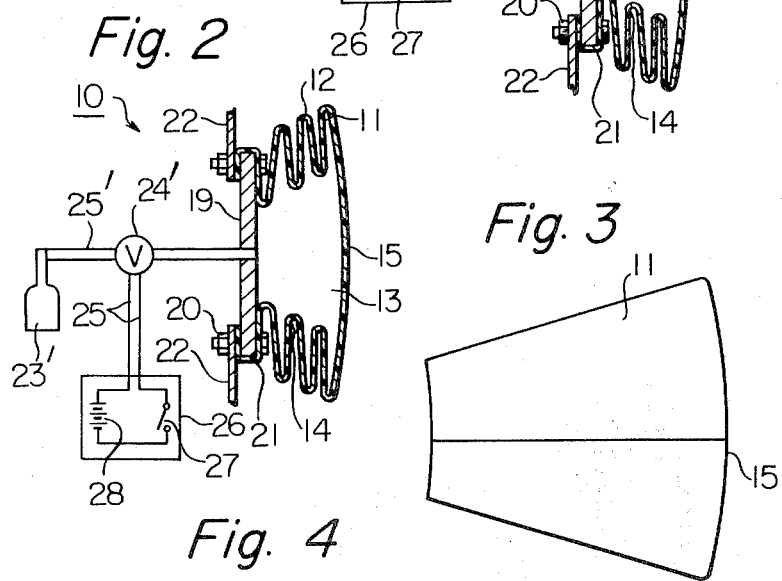
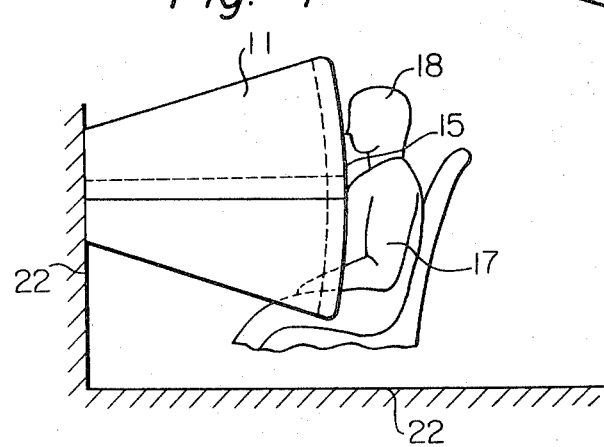
INVENTORS
MASAFUMI HAMASAKI & TAKASHI HARUNA
BY
John Lezley
ATTORNEY

VEHICLE SAFETY DEVICE

This invention relates to vehicle safety devices and, more particularly, to an improved gas bag type safety device in which a frusto-conical, hollow confinement is provided to instantaneously expands so as to be disposed in a protective position adjacent an occupant of a vehicle when the vehicle encounters a collision condition.

Heretofore, many safety devices have been proposed for use on motor vehicles. Such safety devices usually comprise an inflatable confinement which is automatically expanded to a protective position by the flow of working fluid into the confinement, thereby avoiding whip-lash injuries of the vehicle occupants during a collision. In U.S. Pat. No. 3,441,290, there is disclosed one form of such confinement which has a sufficiently large volume to be engageable with substantially the entire body of an occupant when expanded, so that the confinement can reliably restrain movement of the occupant as a result of a collision. However, such prior art confinement has certain disadvantages. First, a source of fluid to be released to the confinement must have a considerably large capacity in order to provide for rapid inflation of the confinement. In addition, an excessive sound and pressure buildup in the vehicle compartment, which would take place upon the inflation of the confinement, tend to do injury to the auditory organ or internal organs of the occupant.

According to the teachings of U.S. Pat. Nos. 3,425,712 and 3,451,694, on the other hand, there is provided an inflatable confinement having a relatively small volume and which is adapted to hold the occupant's body except his head when inflated. However, such confinement is disadvantageous in that if a violent collision takes place the occupant's head is violently flung forward and then backward, so that with this arrangement it would be impossible to avoid whip-lash injury of the occupant.

It is therefore an object of this invention to provide a new and improved type of vehicle safety device with a view to overcoming the above-said disadvantages.

Another object of this invention to provide a new and improved safety device including a frusto-conical, hollow-conical, hollow confinement which is adapted to instantaneously expand to an operative position where the base surface of the frusto-conical confinement engages with and holds the body of an occupant including his head, whereby the occupant is reliably protected from whip-lash injury during a collision.

It is a further object of this invention to provide a new and improved safety device which can be used with a fluid source having a relatively small capacity for high pressure fluid to be released into an inflatable confinement.

These and other objects will be readily apparent from the following description taken in conjunction with the accompanying drawings, in which:

FIG. 1 is a schematic sectional view illustrating one embodiment of this invention with the confinement in its contracted or inoperative condition;

FIG. 2 is similar to FIG. 1 but shows another embodiment of the invention;

FIG. 3 is a side view illustrating the confinement shown in FIGS. 1 or 2 in its expanded or operative condition; and FIG. 4 is a schematic view illustrating the operation of the confinement in a collision.

Referring now to FIG. 1, there is shown a safety device 10 for protecting an occupant of a vehicle during a collision. The safety device 10 can be used in different vehicles, such as a truck, an automobile or an airplane.

The safety device 10 includes an inflatable confinement 11 which is shown in a contracted or inoperative condition and which will be shown in an expanded or operative condition. The confinement 11 comprises stem portion 12 which defines a chamber 13. The stem portion 12, when contracted, has an accordion-like or bellows portion 14, and a base surface 15 against which the vehicle occupant is thrown during a collision. The base surface 15 is curved in its vertical section and sized to engage with the upper portion of a vehicle occupant 17 including his head 18, as shown in FIG. 4. The stem portion 12 is constructed of suitable material which is capable of being inflated and withstanding substantial impact force without rupturing. Materials which have been found suitable for the construction of the stem portion 12 include nylon, polyester, polyacrylonitrile, polyvinylidene chloride and other synthetic or man-made fibers, and certain kinds of natural fibers as well.

According to the teaching of this invention, the inflatable confinement 11 is so constructed that when inflated the confinement 11 takes the shape of a frustum of a cone, the base surface 15 of which is sufficiently large in area, having preferably more than 2,000 cm$^2$, to receive at least the upper portion of the body of the vehicle occupant 17.

The inflatable confinement 11 is securely mounted on a support plate member 19 in an air-tight manner by fastening means such as bolts 20 which secure the upper circumferential portion 21 of the frusto-conical confinement 11 onto the support member 19. The support member 19 in turn is secured in any suitable location in the body 22 of the vehicle so as to enable the confinement 11 to protect the occupant of the vehicle. However, the inflatable confinement 11 may be mounted directly on a structural part of the vehicle rather than the use of the support member 19.

The confinement 11 is inflated from its contracted condition to its expanded condition, shown in FIGS. 3 and 4, by the application of fluid pressure into the chamber 13. There is provided in the chamber 13 suitable means 23 for expanding the confinement 11 to the expanded condition, which means comprises a reservoir storing working fluid under pressure. Fluids which have been found satisfactory according to this invention include fluorocarbons, carbon dioxide, air, nitrogen and certain kinds of combustion gases. Numeral 24 designates suitable means, such as an explosive, for breaking the fluid source 23 to release the operating fluid from the fluid source 23 in response to the vehicle encountering a collision. Two lead wires 25 are shown as leading from the means 24 for releasing the operating fluid, to a sensor device 26 mounted on the vehicle and which completes a circuit upon sensing a predetermined deceleration of the vehicle resulting from a collision. The sensor device 26 includes a switch 27 connected at one end with an electric energy source 28 and at the other with the fluid releasing means 24 for actuating the same.

Turning now to FIG. 2, like numerals indicate like or similar elements shown in FIG. 1. In this embodiment, the fluid source 23' is provided outside of the confinement 11 and can have communication with the chamber 13 through a conduit 25'. An electromagnetic valve 24' is provided intermediately of the conduit 25' for normally interrupting the communication therebetween. The valve 24' is connected with the sensor device 26 through the lead wires 25 so as to electromagnetically open the conduit 25' when actuated. Upon actuation of the valve 24', the working fluid is introduced into the confinement 11 to thereby inflate the same.

In the event of a collision, the sensor device 26 shown in FIG. 1 ignites the explosive 24 to release the working fluid the from the fluid source 23, causing an expansion of the confinement 11 to the condition illustrated in FIGS. 3 and 4. In the expanded condition, the confinement 11 fills a major portion of the area between the occupant 17 of the vehicle and the structural part 22 of the vehicle. More specifically, the confinement 11 is disposed so that the base surface 15 thereof can engage with and hold at least the upper portion of the body of the occupant 17 including his head 18. Thus, it will be appreciated that the energy of the impact of movement of the vehicle occupant 17 is properly absorbed by the confinement 11 in such a manner as to prevent the occupant 17 from incurring whip-lash injury.

Furthermore, the fact that the inflatable confinement 11 is formed frusto-conically rather than cylindrically enables the use of a fluid source having a considerably small capacity for the operating fluid. Moreover, due to the use of such a small capacity of fluid source, it will be understood that pressure buildup in the compartment of the vehicle resulting from the inflation of the confinement is minimized, resulting in a reduction in the possibility of the vehicle occupant being injured on his auditory organ or internal organs. Still moreover, the stem portion 1 of bellows-like construction can assure compactness in axial height and quick expansion of the confinement as well as for holding the substantial flatness of the base surface 15 when the confinement is in its expanded condition.

What is claimed is:

1. In a safety device for a passenger supported by a seat of a vehicle, the safety device comprising an inflatable confinement, which in its contracted position, is bellows folded; a support plate mounted on a portion of the vehicle in front of the passenger to which said inflatable confinement is hermetically secured; a source of working fluid under pressure; means for releasing the working fluid under pressure to inflate said confinement; means for sensing a collision condition of the vehicle and for actuating said fluid releasing means to effect release of the working fluid in response to a predetermined collision condition of the vehicle, the improvement wherein said inflatable confinement, when inflated, has the shape of a frustum of a cone, the base end surface of which faces the passenger and has a slight curvature in vertical section, the said base end surface having an uninterrupted diameter at least as great as the upper portion of the body of the passenger, said surface being in contact with substantially all of at least the upper portion of the body of the passenger.

* * * * *